(12) United States Patent
Kuhlmann et al.

(10) Patent No.: US 8,783,105 B2
(45) Date of Patent: Jul. 22, 2014

(54) YAW-RATE SENSOR AND METHOD FOR OPERATING A YAW-RATE SENSOR

(75) Inventors: Burkhard Kuhlmann, Reutlingen (DE); Rolf Scheben, Stuttgart (DE); Daniel Christoph Meisel, Vaihingen an der Enz (DE); Benjamin Schmidt, Stuttgart (DE); Thorsten Balslink, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 13/305,292

(22) Filed: Nov. 28, 2011

(65) Prior Publication Data

US 2012/0152019 A1 Jun. 21, 2012

(30) Foreign Application Priority Data

Nov. 29, 2010 (DE) .......................... 10 2010 062 095

(51) Int. Cl.
*G01C 19/56* (2012.01)
(52) U.S. Cl.
USPC .................................... 73/504.12; 73/504.04
(58) Field of Classification Search
USPC ................ 73/504.14, 504.12, 504.04, 504.02
See application file for complete search history.

(56) References Cited

U.S. PATENT DOCUMENTS

| | | | |
|---|---|---|---|
| 5,869,760 A * | 2/1999 | Geen ........................... | 73/504.12 |
| 6,837,107 B2 * | 1/2005 | Geen ........................... | 73/504.04 |
| 6,845,665 B2 * | 1/2005 | Geen ........................... | 73/504.04 |
| 6,848,304 B2 * | 2/2005 | Geen ........................... | 73/504.04 |
| 7,240,552 B2 * | 7/2007 | Acar et al. .................. | 73/504.12 |
| 7,284,429 B2 * | 10/2007 | Chaumet et al. ........... | 73/504.12 |
| 7,461,552 B2 * | 12/2008 | Acar ........................... | 73/504.04 |
| 8,342,025 B2 * | 1/2013 | Coronato et al. .......... | 73/504.14 |
| 8,459,110 B2 * | 6/2013 | Cazzaniga et al. ......... | 73/504.12 |
| 8,479,575 B2 * | 7/2013 | Kempe ........................ | 73/504.12 |
| 8,490,483 B2 * | 7/2013 | Wrede et al. ............... | 73/504.12 |
| 8,534,127 B2 * | 9/2013 | Seeger et al. .............. | 73/504.12 |
| 2002/0189351 A1 * | 12/2002 | Reeds et al. ............... | 73/504.04 |
| 2006/0112764 A1 * | 6/2006 | Higuchi ...................... | 73/504.12 |
| 2007/0214883 A1 * | 9/2007 | Durante et al. ............ | 73/504.04 |
| 2010/0095768 A1 * | 4/2010 | Acar et al. .................. | 73/504.04 |
| 2011/0132087 A1 * | 6/2011 | Ohms et al. ................ | 73/504.12 |
| 2012/0125099 A1 * | 5/2012 | Scheben et al. ............ | 73/504.12 |
| 2013/0019680 A1 * | 1/2013 | Kittilsland et al. ........ | 73/504.12 |

FOREIGN PATENT DOCUMENTS

WO  03/064975  8/2003

* cited by examiner

*Primary Examiner* — Helen Kwok
(74) *Attorney, Agent, or Firm* — Kenyon & Kenyon LLP (57) ABSTRACT

A yaw-rate sensor is described as having a substrate which has a main plane of extension for detecting a yaw rate about a first axis extending parallel to the main plane of extension is provided, the yaw-rate sensor having a first rotation element and a second rotation element, the first rotation element being drivable about a first axis of rotation, the second rotation element being drivable about a second axis of rotation, the first axis of rotation being situated perpendicularly to the main plane of extension, the second axis of rotation being situated perpendicularly to the main plane of extension, the first rotation element and the second rotation element being drivable in opposite directions.

11 Claims, 14 Drawing Sheets

YAW-RATE SENSOR AND METHOD FOR OPERATING A YAW-RATE SENSOR

RELATED APPLICATION INFORMATION

The present application claims priority to and the benefit of German patent application no. 10 2010 062 095.5, which was filed in Germany on Nov. 29, 2010, the disclosure of which is incorporated herein by reference.

FIELD OF THE INVENTION

The present invention is directed to a yaw-rate sensor and a method for operating a yaw-rate sensor (DRS).

BACKGROUND INFORMATION

Such yaw-rate sensors and such methods for operating a yaw-rate sensor are generally known.

Yaw-rate sensors are discussed in the related art. For example, a yaw-rate sensor having two oscillating mass elements is discussed in publication WO 2003064975 A1. Micromechanical yaw-rate sensors for yaw rates about an axis which is parallel to the sensor plane (Z' and yaw rate Qy) are normally designed as planarly oscillating masses or as masses performing rotational oscillations in the plane, which are subjected to a Coriolis force, which is perpendicular to the plane, when rotation occurs. This force is ascertained either via the electrostatic counterforce needed for position feedback regulation (closed-loop regulation) or measured via the change in capacitance due to the change in the distance to the substrate (open-loop operation). In addition to the target measured variable, the Coriolis force, there are other medial forces acting on the sensors that may induce a signal, such as, for example, linear accelerations and angular accelerations. The occurrence of these accelerations may result in error signals during operation. With the aid of the differential evaluation of the forces that act on two masses moving in opposite directions, a distinction may be made between the Coriolis force and the force due to linear acceleration (for example two masses oscillating toward each other or a mass performing rotational oscillations in the plane), for which the capacitance is evaluated in two oppositely situated positions.

These sensors are insensitive to the angular acceleration about the y axis and also to the angular acceleration about the z axis. Using conventional sensors, it is, however, disadvantageously impossible to differentiate between the Coriolis force and the force which arises due to the angular acceleration about the x axis. This is extremely problematic, since angular accelerations occur as interference variables.

SUMMARY OF THE INVENTION

It is therefore an object of the exemplary embodiments and/or exemplary methods of the present invention to provide a yaw-rate sensor and a method for operating a yaw-rate sensor which do not have the disadvantages of the related art and are insensitive to angular accelerations and linear acceleration.

The yaw-rate sensor according to the present invention and the method according to the present invention for operating a yaw-rate sensor as recited in the other independent claims have the advantage over the related art that they are insensitive to angular accelerations and linear acceleration.

This advantage is achieved according to the exemplary embodiments and/or exemplary methods of the present invention by a yaw-rate sensor having a substrate which has a main plane of extension for detecting a yaw rate about a first axis extending parallel to the main plane of extension, the yaw-rate sensor having a first rotation element and a second rotation element, the first rotation element being drivable about a first axis of rotation, the second rotation element being drivable about a second axis of rotation, the first axis of rotation being situated perpendicularly to the main plane of extension, the second axis of rotation being situated perpendicularly to the main plane of extension, the first rotation element and the second rotation element being drivable in opposite directions.

Advantageous embodiments and refinements of the present invention are derivable from the subclaims and the description, taking into account the drawings.

According to one refinement, it is provided that the first rotation element and the second rotation element are connected to each other via at least one coupling element. This makes it advantageously possible that an increase in the frequency splitting between parallel drive mode and detection mode with respect to the antiparallel drive mode and detection mode is achievable.

According to another refinement it is provided that the coupling element is connected to the substrate via at least one spring. This makes it advantageously possible, in a particularly simple manner, that an increase in the frequency splitting between parallel drive mode and detection mode with respect to the antiparallel drive mode and detection mode is achievable.

According to another refinement it is provided that the coupling element has a rocker structure having a rocker axis of rotation, the rocker axis of rotation running parallel to the first axis. This makes it advantageously possible that a comparably particularly great increase in the frequency splitting between parallel drive mode and detection mode with respect to the antiparallel drive mode and detection mode is achievable.

According to another refinement it is provided that the first rotation element is designed as an outer ring, the second rotation element being designed as an inner ring, the first rotation element being situated inside the second rotation element, and the first axis of rotation running through the second axis of rotation. This makes it advantageously possible, while achieving a particularly compact design, that an increase in the frequency splitting between parallel drive mode and detection mode with respect to the antiparallel drive mode and detection mode is achievable.

According to another refinement it is provided that at least one first mass element and one second mass element are situated between the first rotation element and the second rotation element, the first mass element being connected to the first rotation element and the second mass element being connected to the second rotation element, the first mass element may be coupled to the second mass element. This makes it advantageously possible that both a particularly interference-insensitive system may be implemented, and an increase in the frequency splitting between parallel drive mode and detection mode with respect to the antiparallel drive mode and detection mode is achievable.

According to another refinement it is provided that the first rotation element has a plate-shaped design, and the second rotation element has a plate-shaped design. This makes it advantageously possible, in a particularly simple manner, that an increase in the frequency splitting between parallel drive mode and detection mode with respect to the antiparallel drive mode and detection mode is achievable.

According to another refinement it is provided that the yaw-rate sensor has a third rotation element having a third axis of rotation and a fourth rotation element having a fourth axis of rotation, the third axis of rotation and the fourth axis of rotation being situated perpendicularly to the main plane of extension, the third rotation element and the first rotation element being drivable in opposite directions, the third rotation element and the fourth rotation element being drivable in opposite directions. This makes it advantageously possible, while increasing the redundancy, that an increase in the frequency splitting between parallel drive mode and detection mode with respect to the antiparallel drive mode and detection mode is achievable.

According to another refinement it is provided that the first rotation element is coupled to the second rotation element, and the third rotation element is coupled to the fourth rotation element. This makes it advantageously possible that an increase in the frequency splitting between parallel detection mode with respect to the antiparallel detection mode is achievable.

Another subject matter of the exemplary embodiments and/or exemplary methods of the present invention concerns a method for operating a yaw-rate sensor having a substrate which has a main plane of extension for detecting a yaw rate about a first axis extending parallel to the main plane of extension, a first rotation element and a second rotation element being provided, the first rotation element being driven about a first axis of rotation, the second rotation element being driven about a second axis of rotation, the first axis of rotation being situated perpendicularly to the main plane of extension, the second axis of rotation being situated perpendicularly to the main plane of extension, the first rotation element and the second rotation element being driven in opposite directions. According to a refinement it is provided that a first, second, third, and fourth rotation elements are provided, the first, second, third, and fourth rotation elements being driven about a first, second, third, and fourth axes of rotation, the first, second, third, and fourth axes of rotation being situated perpendicularly to the main plane of extension, two rotation elements being driven in opposite directions, and the remaining two rotation elements being driven in the same direction. This makes it advantageously possible that an increase in the frequency splitting between parallel drive mode and detection mode with respect to the antiparallel drive mode and detection mode is achievable.

According to a refinement it is provided that the rotation elements are driven parallel to a third axis (y) which is perpendicular to a first axis (x) and to the second axis (z), the rotation elements may be rotatably mounted (in the meaning of a rotational oscillation), a first and second detection signals being generated by the deflection of the first rotation element, a third and fourth detection signal being generated by the deflection of the second rotation element, the first through fourth detection signals being evaluated individually, a fifth and a sixth detection signal may be generated by the deflection of the third rotation element, a seventh and an eighth detection signal being generated by the deflection of the fourth rotation element, the first through eighth detection signals being evaluated individually to measure the angular acceleration about the x and y axes and the linear acceleration along the z axis.

According to another refinement it is provided that the first and the third detection signals and/or the first, the third, the fifth, and the seventh detection signals are added to form a first sum signal, the second and the fourth and/or the second, the fourth, the sixth, and the eighth detection signals being added to form a second sum signal. This makes it advantageously possible that a differential evaluation may be performed in a simple manner.

According to another refinement it is provided that a difference signal is formed from the first sum signal and the second sum signal, the yaw rate being determined as a function of the difference signal. This makes it advantageously possible that the method is insensitive to interfering, and in particular rotational, accelerations.

According to another refinement the quadrature may be compensated for by junction electrodes underneath the rotation elements.

According to another refinement, positive feedback of the detection mode may occur via junction electrodes underneath the rotation elements, thus making a fully resonant operation of the sensor possible.

According to another refinement, decoupling of forces during operation may be suppressed by balancing the masses. The above-mentioned coupling structures may additionally be used for balancing.

Exemplary embodiments of the present invention are illustrated in the drawings and explained in greater detail in the following description.

DETAILED DESCRIPTION

In the different figures, identical parts are provided with identical reference numerals and are therefore normally named or mentioned only once.

Figure 1A:
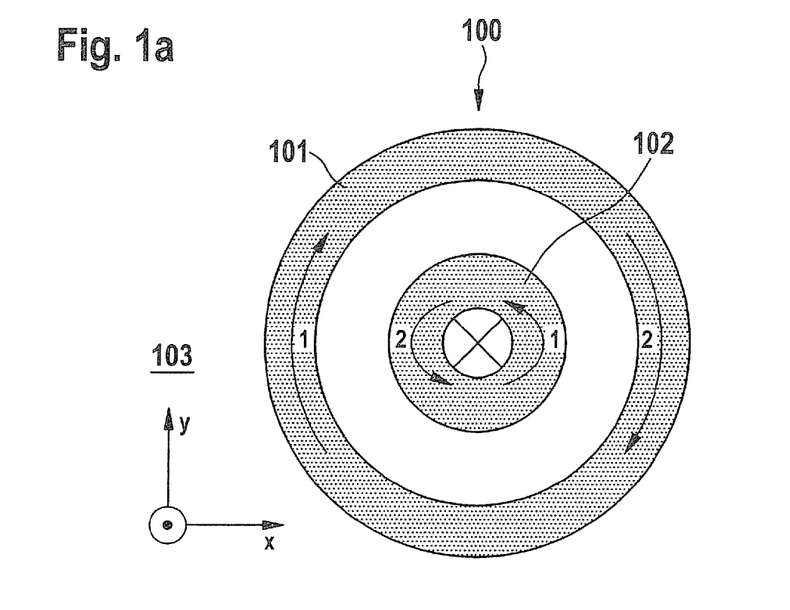
FIG. 1 shows an exemplary specific embodiment of the yaw-rate sensor according to the present invention.
Figure 1B:
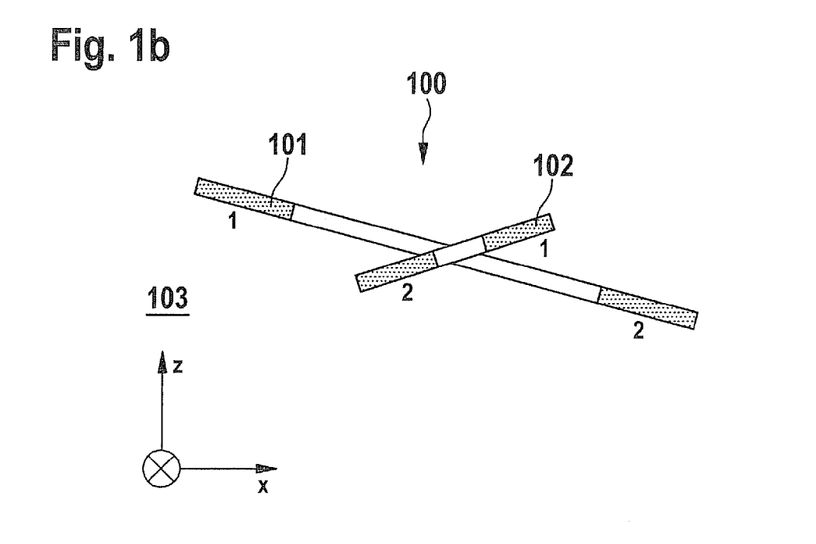

FIGS. 1a and 1b schematically show an exemplary specific embodiment of yaw-rate sensor 100 according to the present invention, composed of two rotors 101, 102 (double-rotor DRS) situated one inside the other having rotational oscillations in opposite directions, and their drive movement and detection movement (the curved arrows representing the movement of a half-phase). First axis X denotes the axis of rotation to be detected and runs parallel to main plane of extension 103 of the substrate. Second axis Y runs perpendicularly to first axis X and parallel to main plane of extension 103 of the substrate. Third axis Z runs perpendicularly to main plane of extension 103 of the substrate. The deflections to be detected are measured in the direction of third axis Z. The areas used in the signal detection for differential capacitance measurement are identified as 1 and 2. A distinction may be made between Coriolis force and linear acceleration or angular acceleration via differential capacitance evaluation of the areas identified as 1 with respect to the areas identified as 2.

Figure 2A:
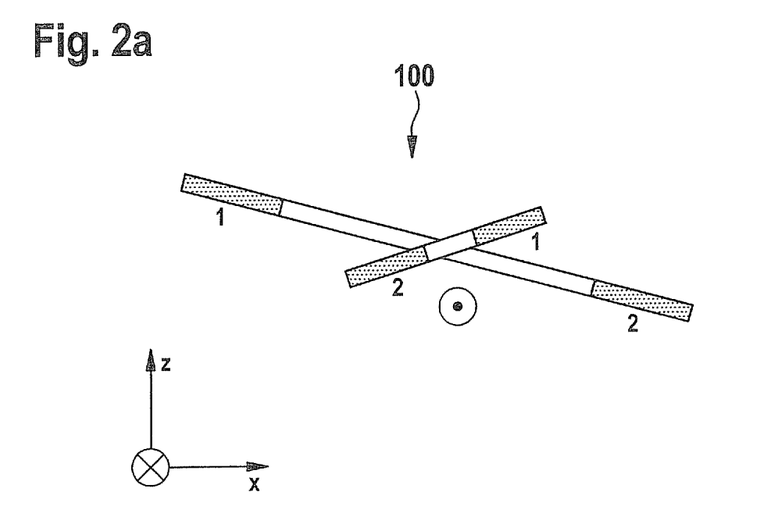
FIG. 2 shows another exemplary specific embodiment of the yaw-rate sensor according to the present invention.
Figure 2B:
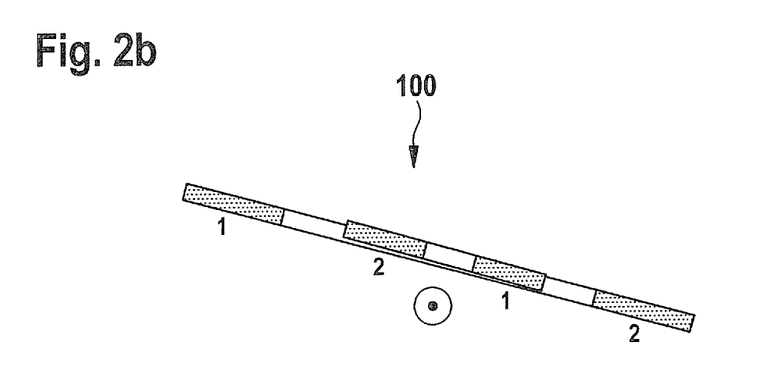

FIGS. 2a and 2b show a side view of the yaw-rate sensor of FIGS. 1a and 1b. The detection deflection of the double-rotor yaw-rate sensor having two planar masses rotationally oscillating in opposite directions due to Coriolis force (dΩx) (FIG. 2a) and angular acceleration (dΩx/dt) (FIG. 2b) differ, so that a sensor of this design may make a distinction between these two forces.

Figure 3A:
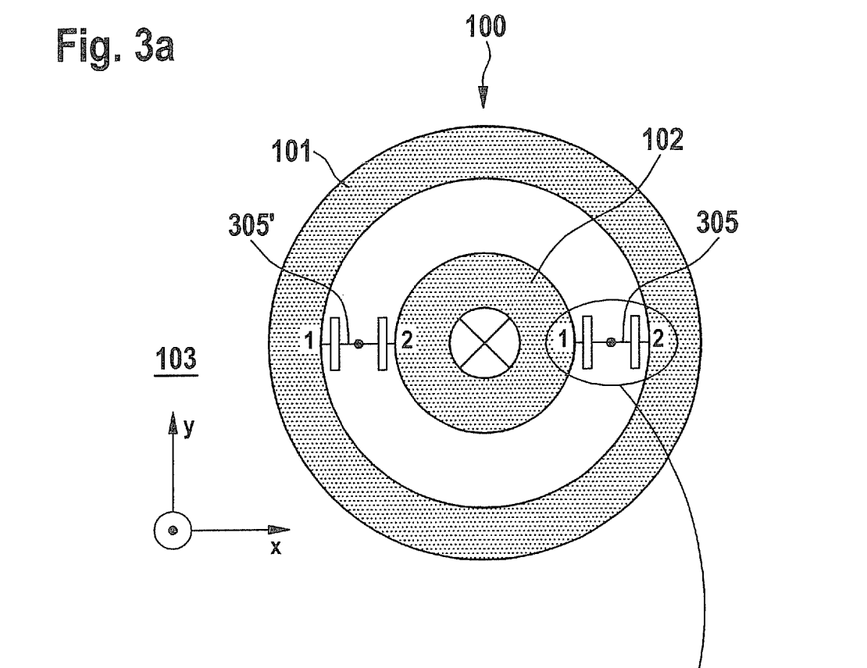
FIG. 3 shows another exemplary specific embodiment of the yaw-rate sensor according to the present invention.
Figure 3B:
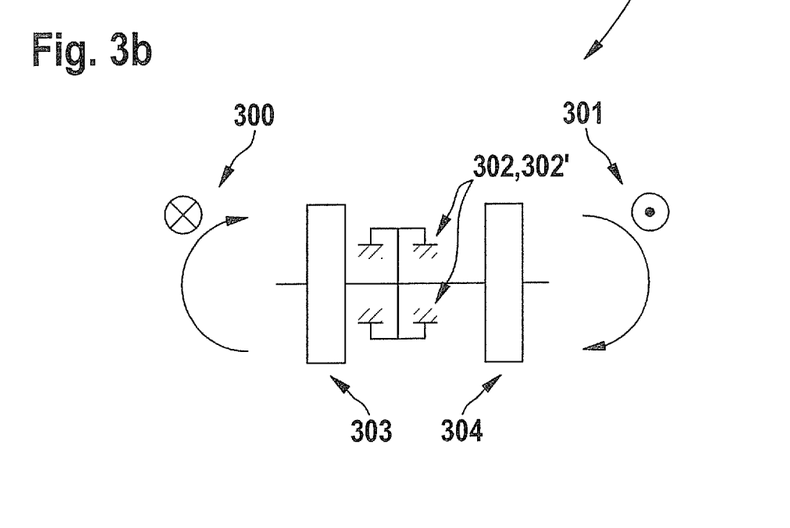

FIGS. 3a and 3b show top views onto another specific embodiment of the yaw-rate sensor according to the present invention and onto a coupling structure 305 for double-rotor yaw-rate sensor 100 for increasing the frequency splitting between parallel drive mode and detection mode with respect to the antiparallel drive mode and detection mode. Yaw-rate sensor 100 has coupling structures 305, 305'. Coupling structures 305, 305' connect rotation elements 101, 102 to one another. Arrows 300 and 301 denote the directions of movement of the rotors. Coupling structure 305 is connected to the substrate via substrate anchors 302, 302'. Coupling structure 305 has compensating springs 303, 304, which are provided for opposite tractions to the left and right (with respect to the drawing plane) or out of the plane.

Figure 4A:
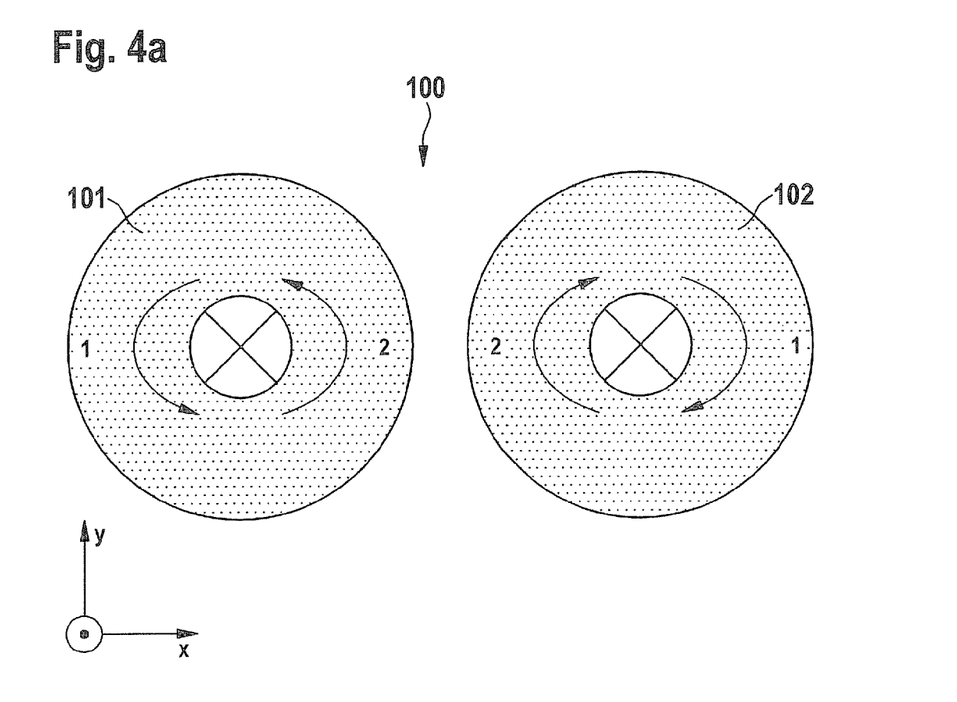
FIG. 4 shows another exemplary specific embodiment of the yaw-rate sensor according to the present invention.
Figure 4B:
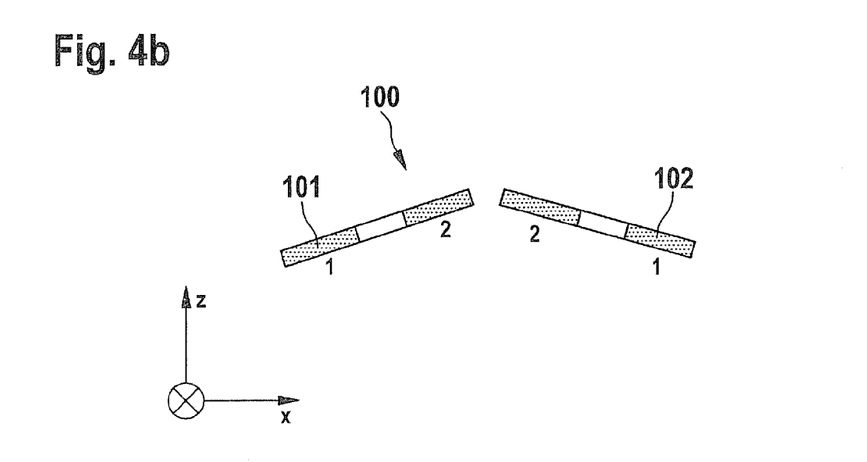

FIGS. 4a and 4b schematically show another exemplary specific embodiment of yaw-rate sensor 100 according to the present invention. FIG. 4a shows the drive movement, and FIG. 4b shows the detection movement. The yaw-rate sensor has two masses performing rotational oscillations in opposite directions which are situated next to each other. The areas used in the signal detection for differential capacitance measurement are identified as 1 and 2. A distinction may be made between Coriolis force and angular acceleration via differential capacitance evaluation of the areas identified as 1 with respect to the areas identified as 2.

Figure 5:
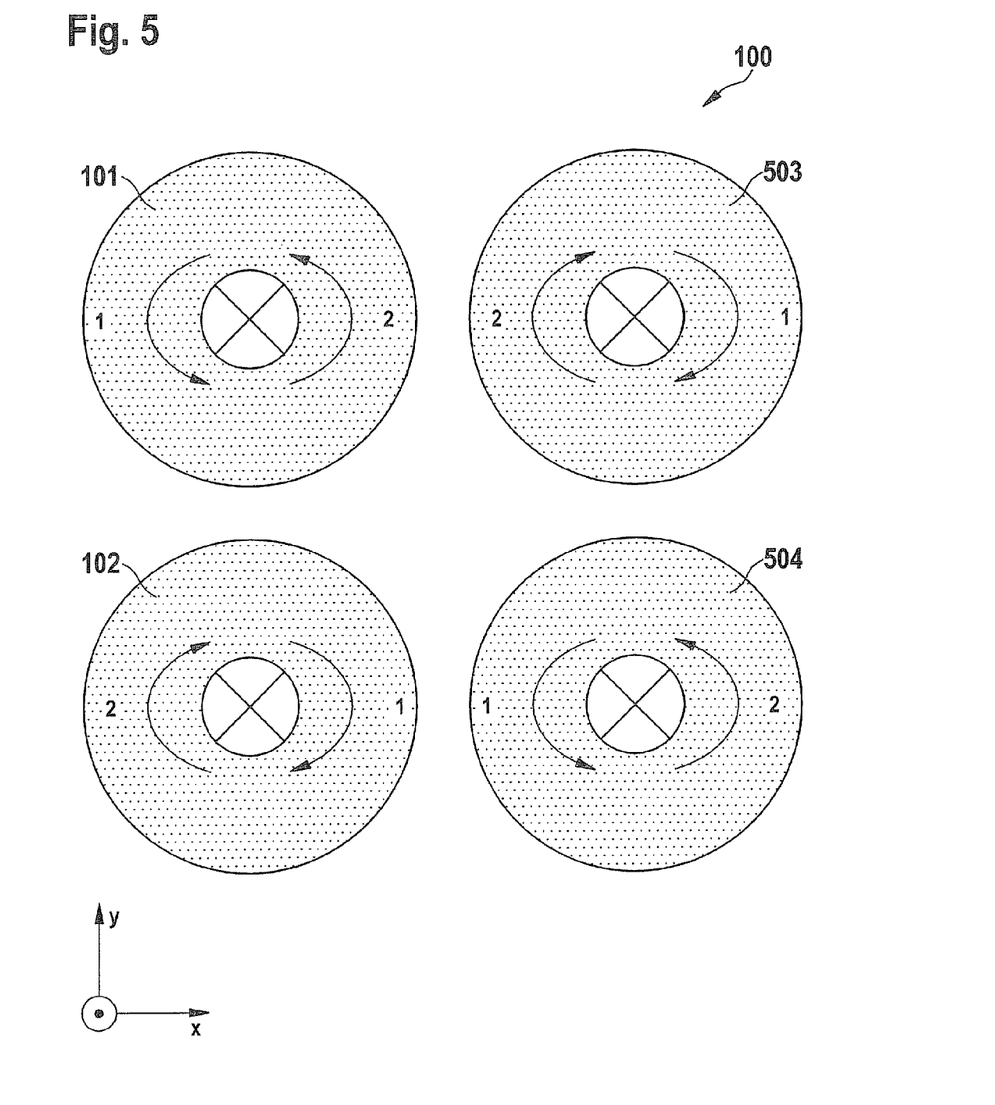
FIG. 5 shows another exemplary specific embodiment of the yaw-rate sensor according to the present invention.

FIG. 5 schematically shows another exemplary specific embodiment of yaw-rate sensor 100 according to the present invention. Yaw-rate sensor 100 has a third rotation element 503 and a fourth rotation element 504. FIG. 5 shows the drive movement of the yaw-rate sensor in top view. The yaw-rate sensor has four masses performing rotational oscillations in opposite directions. The areas used in the signal detection for differential capacitance measurement are identified as 1 and 2. A distinction may be made between Coriolis force and angular acceleration via differential capacitance evaluation of the areas identified as 1 with respect to the areas identified as 2.

Figure 6A:
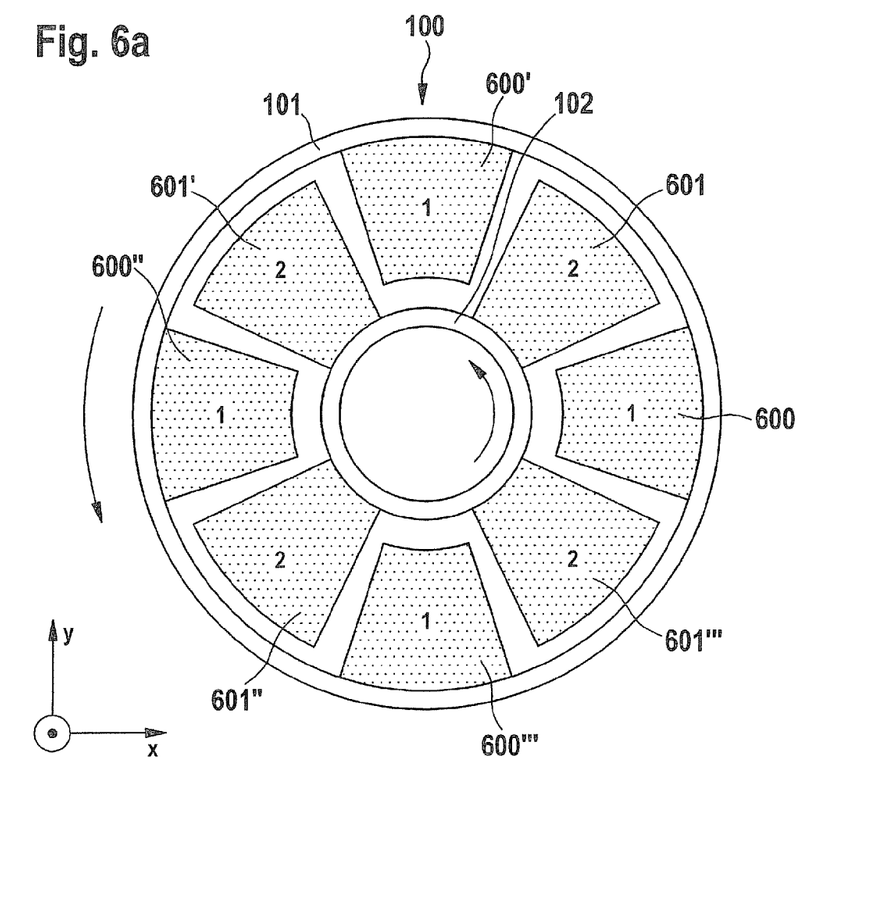
FIG. 6 shows another exemplary specific embodiment of the yaw-rate sensor according to the present invention.
Figure 6B:
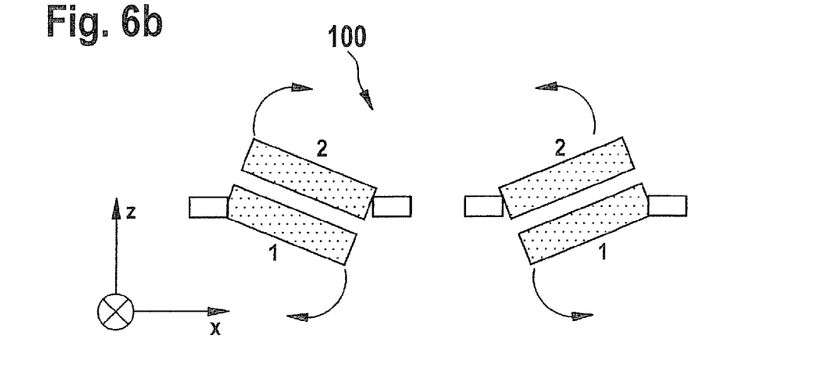

FIGS. 6a and 6b schematically show another exemplary specific embodiment of yaw-rate sensor 100 according to the present invention. Yaw-rate sensor 100 has two frames 101, 102, performing rotational oscillations concentrically in opposite directions, to which masses 600, 600', 600", 600'", 601, 601', 601", 601'" are alternatingly attached. The surfaces used in the signal detection for differential capacitance measurement are identified as 1 and 2. A distinction may be made between Coriolis force and angular acceleration via differential capacitance evaluation of areas 1 and 2. Surfaces 1, 2 may move/tilt out of the plane.

Figure 7A:
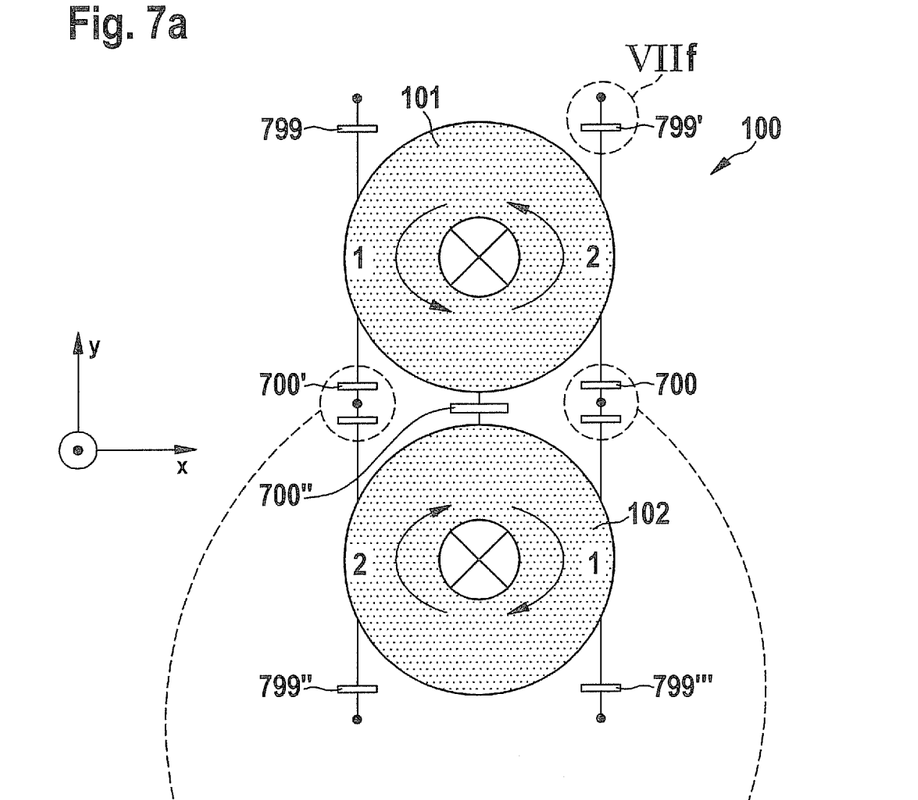
FIG. 7 shows another exemplary specific embodiment of the yaw-rate sensor according to the present invention.
Figure 7B:
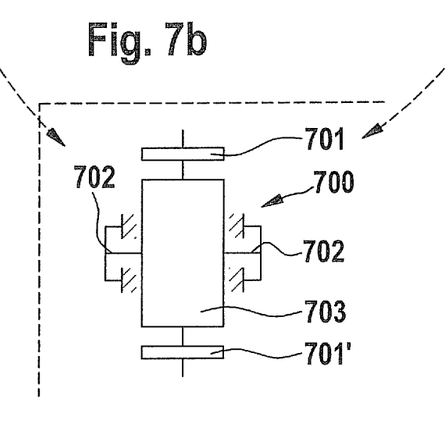
Figure 7C:
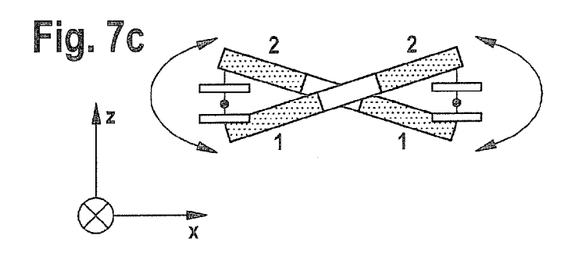
Figure 7D:
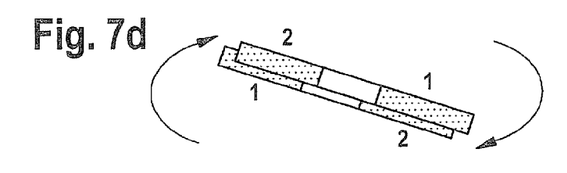
Figure 7E:
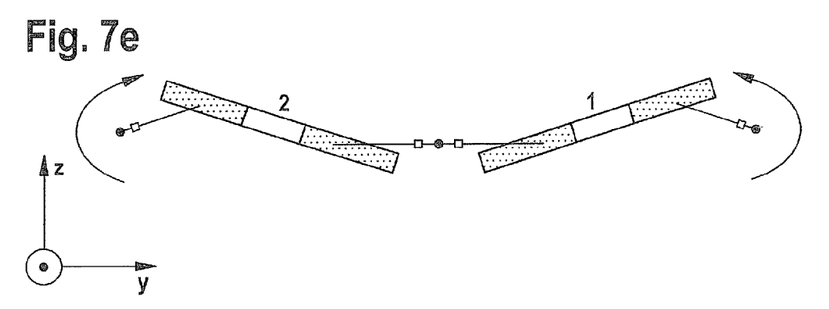
Figure 7F:
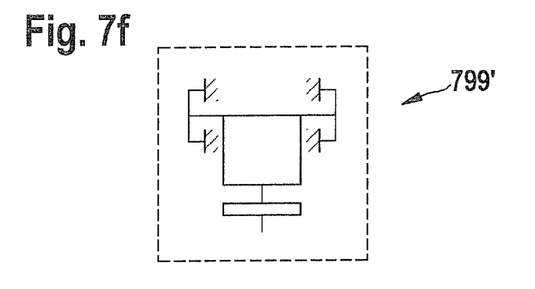

FIGS. 7a, 7b, 7c, 7d, 7e, 7f schematically show another exemplary specific embodiment of yaw-rate sensor 100 according to the present invention. FIG. 7a shows a top view onto a coupled drive movement of yaw-rate sensor 100 having two masses 101, 102 performing rotational oscillations in opposite directions. Rotation elements 101, 102 are connected to one another via coupling structures 700, 700', 700" (optional element). Rotation elements 101, 102 are connected to the substrate via connecting structures 799, 799', 799", 799'". Balancing is advantageously possible using coupling structure 700". Coupling structure 700 has springs 701, 701', a rocker 703, and connecting elements 702, 702', which connect rocker 703 to the substrate. The areas used in the signal detection for differential capacitance measurement are identified as 1 and 2. FIG. 7c shows the antiparallel detection movement (relevant mode for signal detection). FIG. 7d shows the parallel detection movement (interference mode); FIG. 7b shows a micromechanical, rocker-type structure 700 for canceling the degeneracy between parallel and antiparallel detection modes, i.e., shifting the parallel detection mode to higher frequencies. A lower interference sensitivity is thus advantageously achieved. Micromechanical structure 700 has, at the connection points between the rocker and the masses performing rotational oscillations, compensating springs for compensating the drive movement. FIG. 7f shows an enlarged view of connecting structure 799'. Connecting structures 799, 799', 799", 799'" advantageously result in symmetrization of the sensor, which therefore has a lower interference susceptibility. FIG. 7e schematically shows another interference movement, which is shifted to higher frequencies, i.e., suppressed, by the rocker structures.

Figure 8:
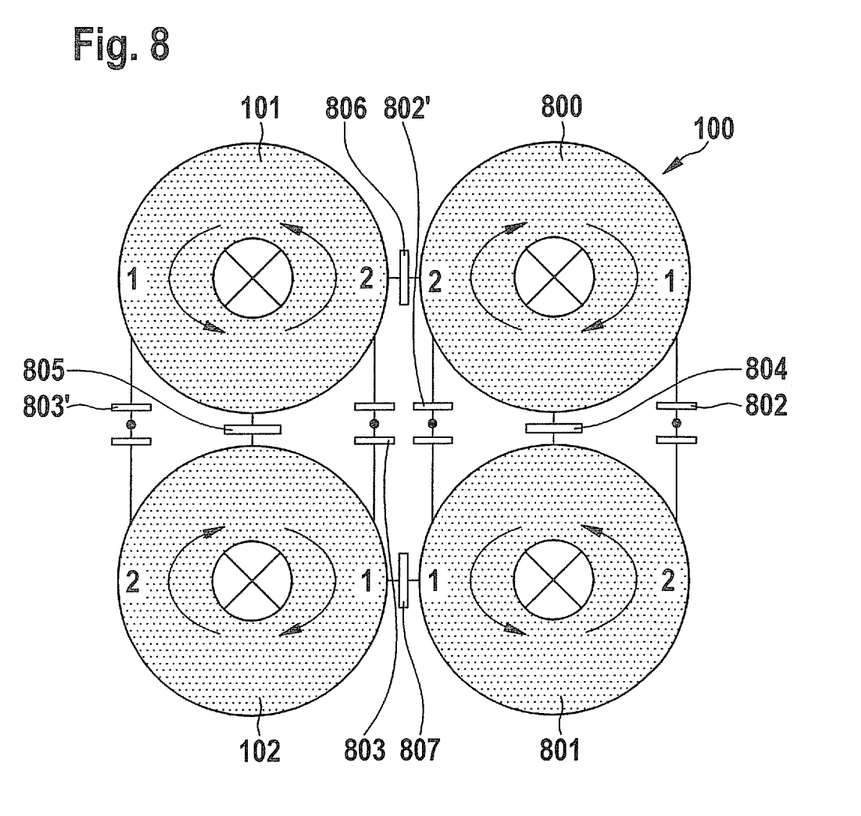
FIG. 8 shows another exemplary specific embodiment of the yaw-rate sensor according to the present invention.

FIG. 8 schematically shows another exemplary specific embodiment of yaw-rate sensor 100 according to the present invention, the drive movement being illustrated. The yaw-rate sensor has four masses 101, 102, 800, 801 performing rotational oscillations in opposite directions. The areas used in the signal detection for differential capacitance measurement are identified as 1 and 2. Two rotation elements are connected to each other via each of coupling structures 802, 802', 803, 803', 804, 805, 806, 807, which are designed as rocker structures, for example; these coupling structures each couple areas 1 and 2 and result in cancellation of the mode degeneracy between parallel and antiparallel detection modes and between parallel and antiparallel drive modes, i.e., the parallel detection mode and drive mode are shifted to higher frequencies.

Figure 9:
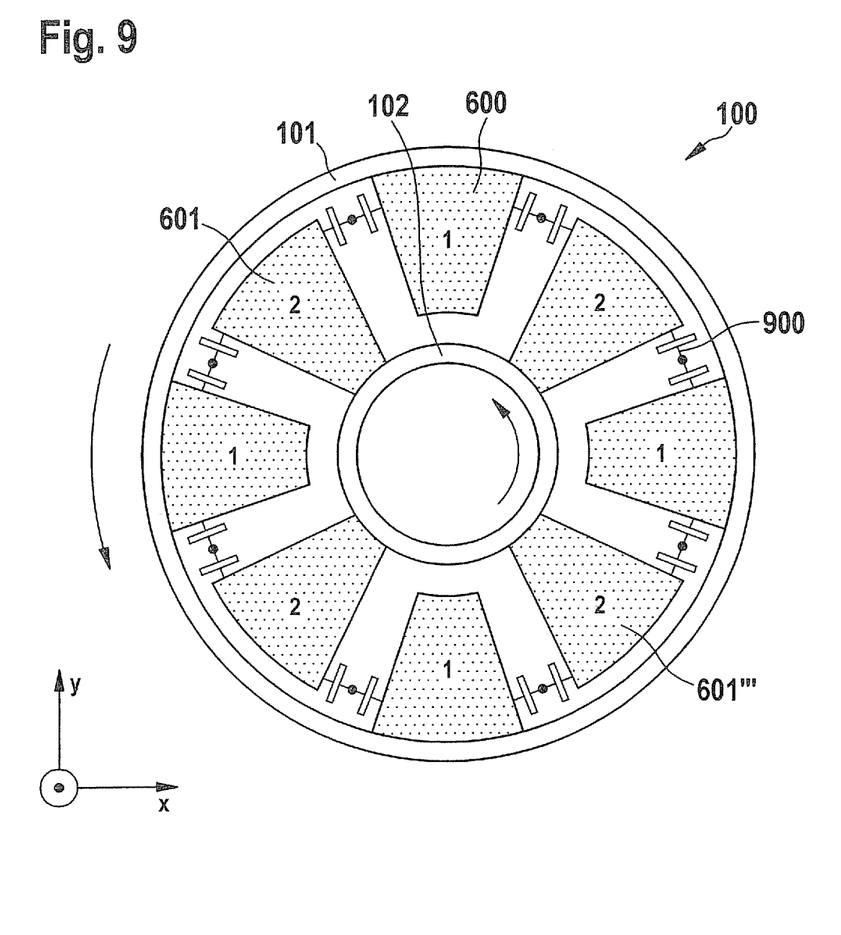
FIG. 9 shows another exemplary specific embodiment of the yaw-rate sensor according to the present invention.

FIG. 9 schematically shows another exemplary specific embodiment of yaw-rate sensor 100 according to the present invention, the drive movement being illustrated. The yaw-rate sensor differs from the specific embodiment of FIG. 6a in that coupling structures 900 between masses 600, 601 are additionally provided. Yaw-rate sensor 100 has two concentric frames rotating in opposite directions (i.e., performing rotational oscillations) to which masses (1 and 2) are alternatingly attached. The areas used in the signal detection for differential capacitance measurement are identified as 1 and 2. Micromechanical rocker structures 900 may couple areas 1 and 2 and result in cancellation of the mode degeneracy between parallel and antiparallel detection modes, i.e., the parallel detection mode is shifted to higher frequencies.

Figure 10:
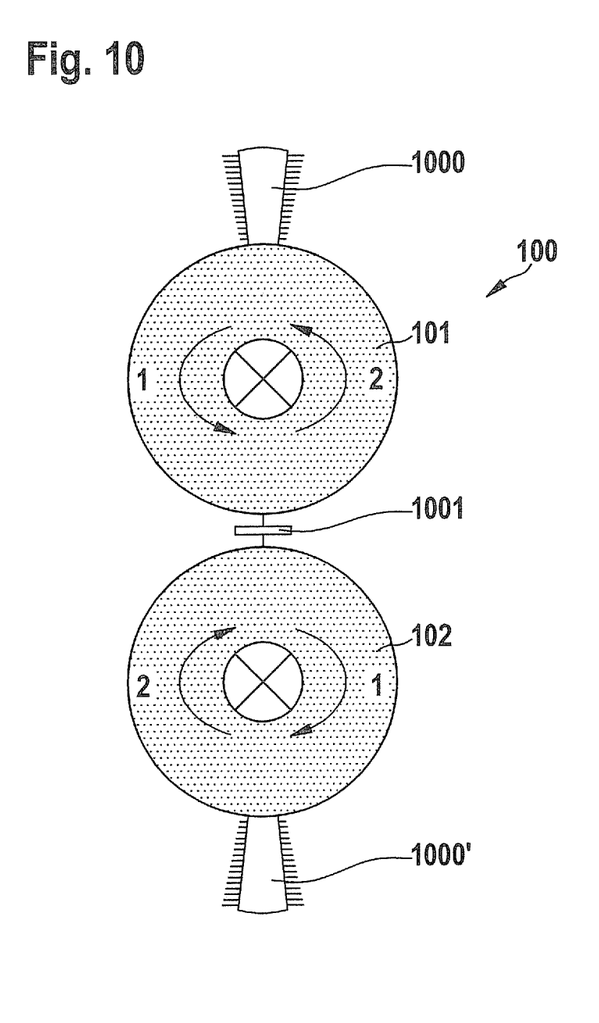
FIG. 10 shows another exemplary specific embodiment of the yaw-rate sensor according to the present invention.

FIG. 10 schematically shows another exemplary specific embodiment of yaw-rate sensor 100 according to the present invention, the drive movement being illustrated. Yaw-rate sensor 100 has two masses 101, 102 performing rotational oscillations in opposite directions, which are connected to each other via a coupling element 1001. Drive structures 1000, 1000', which are tightly connected to the masses performing rotational oscillations, are shown on rotation elements 101, 102. Electrostatic forces between the comb structures of these drive structures and matching counterstructures (not illustrated), which have a connection to the substrate, make it possible to drive the two masses performing rotational oscillations. Due to the rotary movement form, the combs are aligned in a tangentially curved manner both to the rotor (actuator combs) and to the substrate (stator combs).

Figure 11:
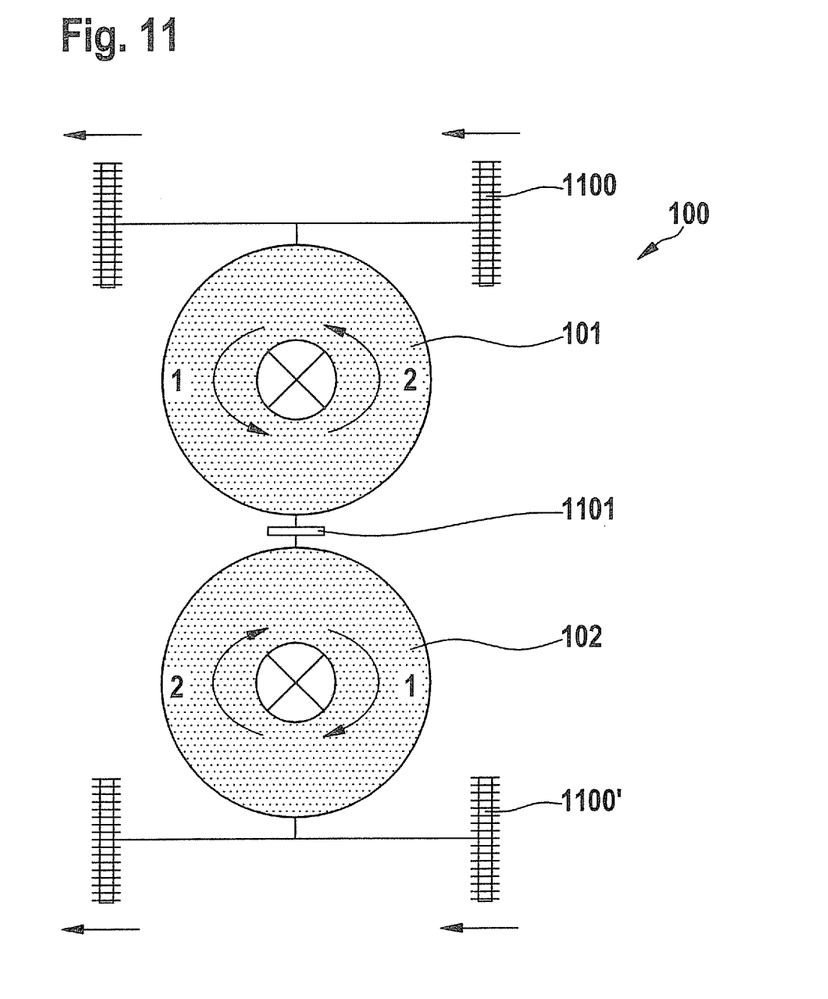
FIG. 11 shows another exemplary specific embodiment of the yaw-rate sensor according to the present invention.

FIG. 11 schematically shows another exemplary specific embodiment of yaw-rate sensor 100 according to the present invention, the drive movement being illustrated. FIG. 11 shows the coupled drive movement of yaw-rate sensor 100 having two masses 101, 102 performing rotational oscillations in opposite directions, which are connected to each other via a coupling element 1101. Drive structures 1100, 1100', which are connected to the masses performing rotational oscillations via rigid elements in the direction of movement of the drive structures (see curved arrows) and elastic elements perpendicular to their direction of movement are situated on rotation elements 101, 102. Electrostatic forces between the comb structures of these drive structures and matching counterstructures (not illustrated), which have a connection to the substrate, make it possible to drive the two masses performing rotational oscillations.

Figure 12A:
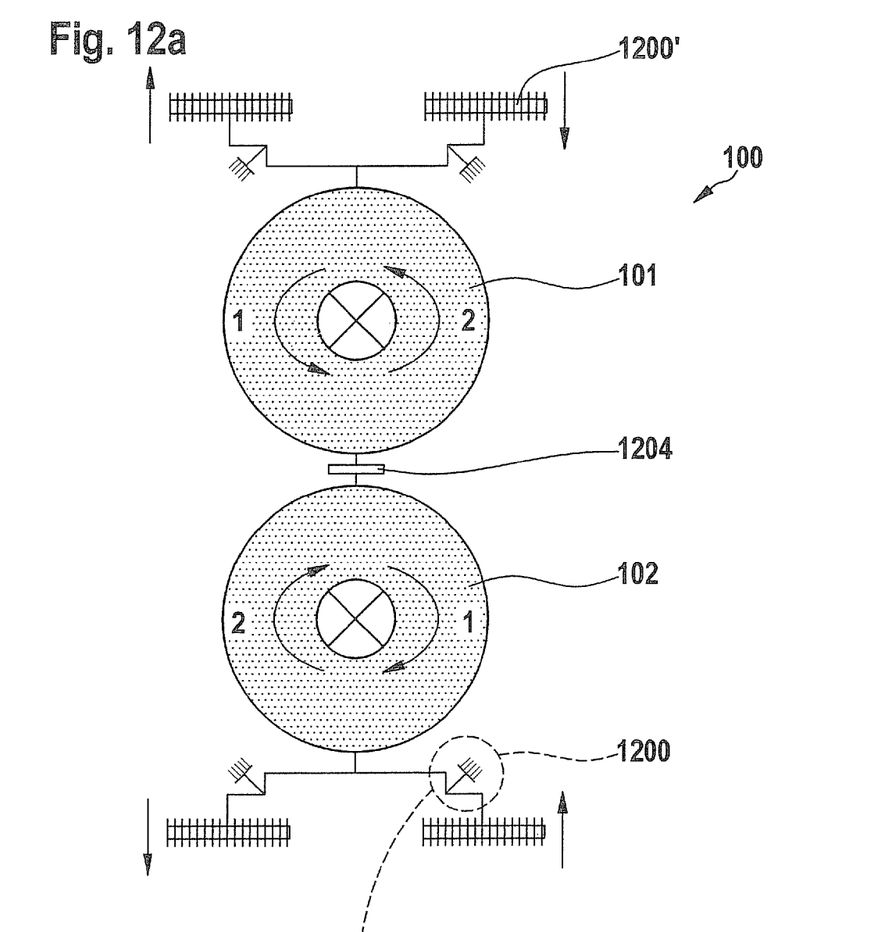
FIG. 12 shows another exemplary specific embodiment of the yaw-rate sensor according to the present invention.
Figure 12B:
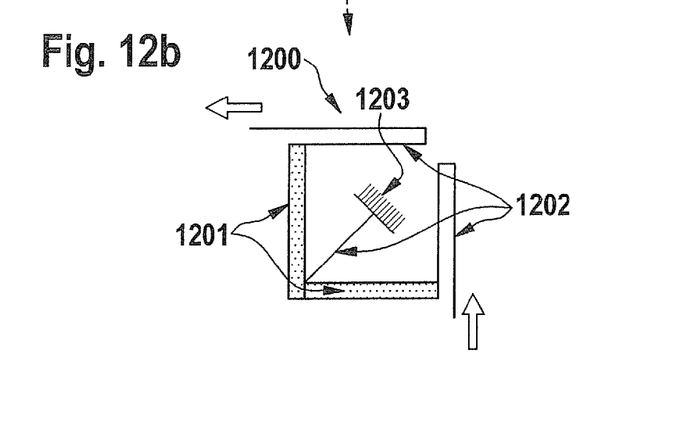

FIG. 12a and FIG. 12b schematically show another exemplary specific embodiment of yaw-rate sensor 100 according to the present invention, the drive movement being illustrated. FIG. 12a shows the coupled drive movement of yaw-rate sensor 100 having two masses 101, 102 performing rotational oscillations in opposite directions, which are connected to each other via a coupling element 1204. Micromechanical drive structures 1200, 1200', which are connected to the masses performing rotational oscillations via rigid elements 1201 and elastic elements 1202 are situated on rotation elements 101, 102. The up and down movement (along the Y direction) of the drive structures is rotated 90° (along the x direction) via deflection frames (see detail drawing in FIG. 12b) to ensure the necessary drive movement of the masses. Electrostatic forces between the comb structures of these drive structures and matching counterstructures (not illustrated), which have a connection 1203 to the substrate, make it possible to drive the two masses performing rotational oscillations.

Figure 13:
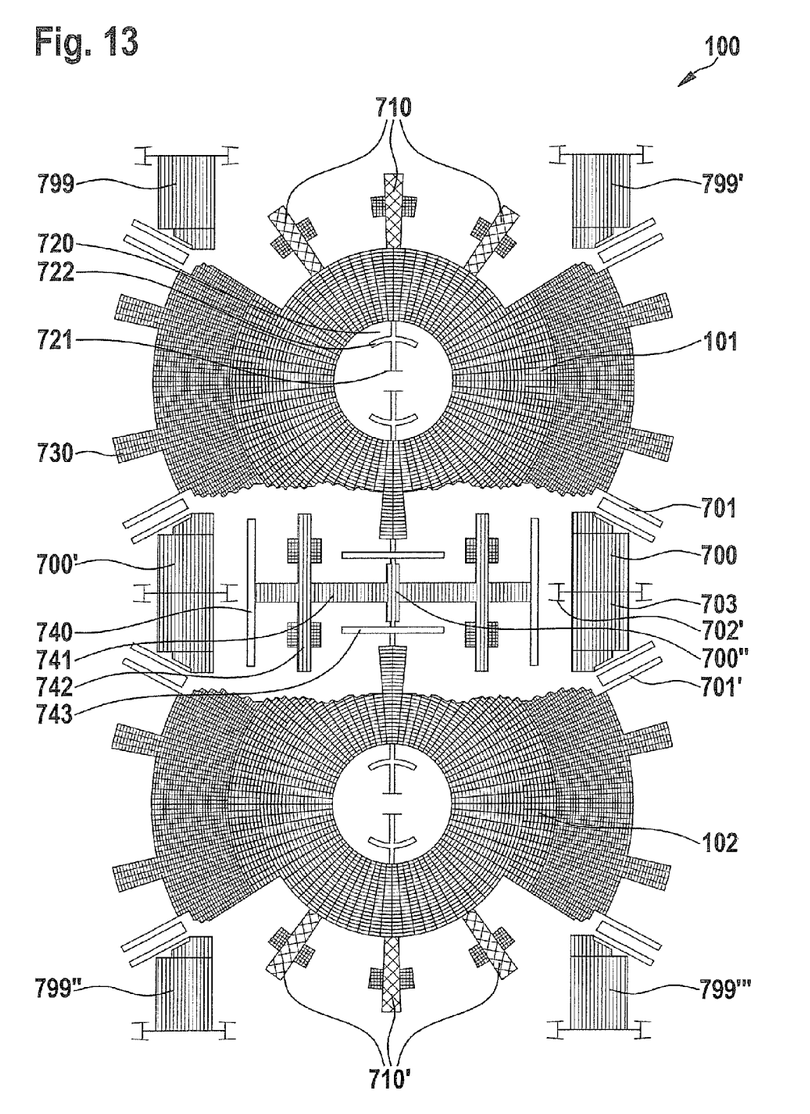
FIG. 13 shows another exemplary specific embodiment of the yaw-rate sensor according to the present invention.

FIG. 13 shows a detailed illustration of yaw-rate sensor 100 according to the present invention from FIGS. 7a through 7f. Yaw-rate sensor 100 has a drive arrangement 710, 710' having comb electrodes, which excite masses 101, 102, which are connected to each other via a coupling element 700", to the rotational oscillations of the drive movement in opposite directions. Coupling element 700" has a mass 742, phi springs for stress balancing, which connect the mass of coupling element 700" to masses 101, 102. Furthermore, 700" contains symmetrically arranged detection arrangement 741, having comb electrodes and springs, including substrate connection 740. The drive movement is caused by central rotation springs 720, which are present in duplicate in the center of both masses 101 and 102. Springs 720 contain stress-balancing structures 722 and substrate connections 721. Arising quadratures may be compensated by the electrodes located underneath symmetrically arranged quadrature structures 730.

What is claimed is:

1. A yaw-rate sensor, comprising:
    a substrate, which has a main plane of extension for detecting a yaw rate about a first axis extending parallel to the main plane of extension;
    a first rotation element;
    a second rotation element, wherein the first rotation element is drivable about a first axis of rotation, wherein the second rotation element is drivable about a second axis of rotation, wherein the first axis of rotation is situated perpendicular to the main plane of extension, wherein the second axis of rotation is situated perpendicular to the main plane of extension, and wherein the first rotation element and the second rotation element is drivable in opposite directions;
    wherein the first rotation element is configured as an outer ring, wherein the second rotation element is configured as an inner ring, wherein the first rotation element is situated inside the second rotation element, and wherein the first axis of rotation runs through the second axis of rotation.

2. The yaw-rate sensor of claim 1, wherein the first rotation element and the second rotation element are connected to each other via at least one coupling element.

3. The yaw-rate sensor of claim 2, wherein the coupling element is connected to the substrate via at least one spring.

4. The yaw-rate sensor of claim 3, wherein the coupling element has a rocker structure having a rocker axis of rotation, the rocker axis of rotation running parallel to the first axis.

5. The yaw-rate sensor of claim 1, wherein at least one first mass element and one second mass element are situated between the first rotation element and the second rotation element, wherein the first mass element is connected to the first rotation element and the second mass element is connected to the second rotation element, and wherein the first mass element is coupled to the second mass element.

6. The yaw-rate sensor of claim 1, wherein the first rotation element has a plate-shaped configuration, and wherein the second rotation element has a plate-shaped configuration.

7. The yaw-rate sensor of claim 1, wherein the yaw-rate sensor has a third rotation element having a third axis of rotation and a fourth rotation element having a fourth axis of rotation, the third axis of rotation and the fourth axis of rotation being situated perpendicular to the main plane of extension, the third rotation element and the first rotation element being drivable in opposite directions, the third rotation element and the fourth rotation element being drivable in opposite directions.

8. The yaw-rate sensor of claim 7, wherein the first rotation element is coupled to the second rotation element, and the third rotation element is coupled to the fourth rotation element.

9. A method for operating a yaw-rate sensor, the method comprising:
    driving a first rotation element about a first axis of rotation of the yaw-rate sensor, which has a substrate which has a main plane of extension for detecting a yaw rate about a first axis extending parallel to the main plane of extension, wherein the first rotation element and a second rotation element are situated; and
    driving the second rotation element about a second axis of rotation, the first axis of rotation being situated perpendicularly to the main plane of extension, the second axis of rotation being situated perpendicularly to the main plane of extension, the first rotation element and the second rotation element being driven in opposite directions;
    wherein the first rotation element is configured as an outer ring, wherein the second rotation element is configured as an inner ring, wherein the first rotation element is situated inside the second rotation element, and wherein the first axis of rotation runs through the second axis of rotation.

10. The method of claim 9, wherein the first and second rotation elements are tilted parallel to the second axis of rotation, a first and a second detection signal being generated by a deflection of the first rotation element, a third and a fourth detection signal being generated by a deflection of the second rotation element, the first through fourth detection signals being evaluated individually, a fifth and a sixth detection signal being generated by a deflection of a third rotation element, a seventh and an eighth detection signal being generated by a deflection of a fourth rotation element, the first through eighth detection signals being evaluated individually.

11. The method of claim 10, wherein the first and the third detection signals and/or the first, the third, the fifth, and the seventh detection signals are added to form a first sum signal, the second and the fourth detection signals and/or the second, the fourth, the sixth, and the eighth detection signals being added to form a second sum signal, a difference signal being formed from the first sum signal and the second sum signal, the yaw rate being determined as a function of the difference signal, a grid electrode being furthermore situated.

* * * * *